United States Patent [19]

Pollock

[11] 3,936,289
[45] Feb. 3, 1976

[54] METHOD AND APPARATUS FOR SELECTIVELY COOLING GLASS DURING ITS ADVANCE ALONG A MOLTEN METAL SURFACE

[75] Inventor: E. Kears Pollock, Allison Park, Pa.
[73] Assignee: PPG Industries, Inc., Pittsburgh, Pa.
[22] Filed: Oct. 15, 1974
[21] Appl. No.: 514,979

[52] U.S. Cl. .................. 65/65 A; 65/99A; 65/182 R
[51] Int. Cl.² ............................................ C03B 18/02
[58] Field of Search ............... 65/65 A, 99 A, 182 R

[56] References Cited
UNITED STATES PATENTS 3,328,147  6/1967  Touvay ........................ 65/182 R X
3,684,475  8/1972  Bondarev et al. ................ 65/99 A X Primary Examiner—Arthur D. Kellogg

[57] ABSTRACT

An advancing layer or sheet of glass is supported on molten metal and its central portion is selectively cooled by direct conductive and convective heat transfer to and through the supporting molten metal. To accomplish this the depth of molten metal beneath the glass is made to differ across the width of the glass layer transverse to the intended path of glass advance. This controlled heat transfer between the glass and the supporting molten metal is particularly useful in a process wherein the molten glass is delivered onto the molten metal along a substantially horizontal path.

7 Claims, 4 Drawing Figures

METHOD AND APPARATUS FOR SELECTIVELY COOLING GLASS DURING ITS ADVANCE ALONG A MOLTEN METAL SURFACE

BACKGROUND OF THE INVENTION

1. Field of the Invention

This invention relates to a method and apparatus for the manufacture of a continuous sheet of flat glass by supporting molten glass on a pool of molten metal and advancing it along the surface of the pool of molten metal while cooling it to form a continuous sheet of flat glass. More particularly, this invention relates to a method for selectively adjusting and maintaining the condition of the glass at different locations across its width to stabilize the path of movement of the glass as it advances along the surface of the pool of molten metal.

2. Description of the Prior Art

Flat glass may be produced in many different ways. Several methods have been disclosed in the past which involve floating or supporting glass on the surface of a pool of molten metal as it is advanced along that surface and cooled to form a continuous sheet of flat glass. For example, molten glass may be delivered onto a pool of molten metal and formed into a continuous sheet or ribbon or glass according to the teachings of Heal, U.S. Pat. No. 710,357 or of Hitchcock, U.S. Pat. No. 789,911 or according to the methods disclosed in the patents of Pilkington, U.S. Pat. Nos. 3,083,551 and 3,220,816 or according to the teachings of Edge and Kunkle found in U.S. Pat. No. 3,843,346. These patents describe processes in which molten glass delivery techniques vary, yet they share the common disclosure that a continuous sheet of flat glass may be formed by advancing a layer of glass along the surface of a pool of molten metal while cooling the glass until it assumes a final width and thickness as a dimensionally stable, continuous sheet of glass.

In the method of Heal, molten glass is delivered over a refractory bridge and then flows slightly downwardly onto the surface of a pool of molten metal confined between two side walls of a forming chamber. This layer of glass advances along the surface of the pool of molten metal between the side walls and remains in contact with them as it is advanced and cooled to form a dimensionally stable, continuous sheet of glass. In the method of Hitchcock, molten glass is delivered through a slot in a refractory wall and flows horizontally onto the surface of a pool of molten metal in a forming chamber. The glass advances along the surface of the pool of molten metal as a layer of constant width and is cooled and advanced at a sufficient speed to form a dimensionally stable, continuous sheet of glass of desired thickness. In the method described by Pilkington, molten glass is delivered through a long, narrow canal and over a refractory lip and then falls freely downwardly onto the surface of a pool of molten metal. It then spreads laterally, outwardly and rearwardly in an unhindered fashion. An advancing layer of glass is drawn along the surface of the pool of molten metal from this laterally, outwardly moving body of molten glass. This layer of glass is advanced as its width diminishes and as it is cooled to form a dimensionally stable, continuous sheet of glass of desired thickness and width. In the method disclosed by Edge and Kunkle, molten glass in a pool of molten glass is conditioned to establish a region of forward flow near its surface, and this forwardly flowing glass is delivered over a threshold member substantially horizontally onto the surface of a pool of molten metal maintained at or near the elevation of the threshold over which the glass is delivered. This flowing molten glass is advanced along the surface of the pool of molten metal as it is initially cooled either having its marginal edges free of contact with side members or having them in contact with selected side members for a short distance. The glass is thereafter advanced along the surface of the pool of molten metal while being further cooled to form a dimensionally stable, continuous sheet of glass.

The present invention provides a method and apparatus for steering and stabilizing an advancing layer or ribbon of glass supported on molten metal in a forming chamber to avoid the persistent tendency of advancing glass to drift from side to side when the glass is delivered and formed in the manner disclosed by Pilkington. Meanwhile, the present method and apparatus provide for a further improvement in the flattening of the velocity for the flow of molten glass immediately following its delivery for forming. This assists in the making of glass having excellent optical quality extending throughout the width of the glass.

In the practice of this invention a continuous sheet of flat glass is produced by a method including the following steps: A layer of molten glass is delivered onto the surface of a pool of molten metal maintained within a forming chamber. The molten metal is preferably tin, an alloy of tin or some other metal having a specific gravity greater than the glass and having a melting point lower than the glass to be formed while being substantially nonreactive to the glass at its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces are applied to the glass which are aligned substantially along its path to cause it to be advanced. These forces may be sufficient to cause the glass to be attenuated to a thickness less than an equilibrium thickness during its advance. These forces are characterized as longitudinal tractive forces and may be applied to the glass at any location along the length of the glass sheet. They are preferably applied to the glass at locations well along its path of advance, preferably beyond the supporting pool of molten metal, and are transferred to the hot or more fluid glass primarily due to the surface tension of the glass. Other forces may be applied to the glass in a manner such that they are aligned substantially across or transverse to the path of glass advance. These forces are characterized as transverse forces. The resultant forces caused by the application of the described forces in combination with the reactive surface tension and gravity forces acting on the glass cause the glass to be formed into a continuous, flat sheet of desired thickness.

After the glass has been cooled sufficiently to become dimensionally stable (that is, if it has reached its final width and thickness) it is advanced farther along the surface of molten metal and then is lifted from the surface of the pool of molten metal and conveyed from the forming chamber. It may be lifted slightly and conveyed along a substantially horizontal path from the forming chamber, or it may be lifted and conveyed upwardly from the pool of molten metal in the manner described by Gerald E. Kunkle in his copending, commonly assigned patent application, Ser. No. 483,508, filed June 27, 1974, which is incorporated by reference herein. The glass is cooled sufficiently prior to lifting it from the surface of the pool of molten metal so that its width and thickness remain unchanged during lifting and conveyance from the forming chamber.

As the glass is being formed during its advance along the surface of the pool of molten metal and as it is conveyed from the pool of molten metal, it is controllably cooled. The cooling is coordinated with the rate of glass advance to form a continuous sheet of glass of desired width and thickness. If the layer of glass is permitted initially to spread laterally outwardly in an unhindered manner, the cooling and rate of glass advance are advantageously coordinated to simultaneously attenuate the thickness and the width of the glass in the manner disclosed by Charnock in U.S. Pat. No. 3,352,657 and by Dickinson et al. in U.S. Pat. No. 3,695,859. Nevertheless, a preferred practice involves maintenance of the width of the glass equal to or less than the width of the initially delivered layer of glass for this in and of itself helps to stabilize the path of advance of the glass.

SUMMARY OF THE INVENTION

Immediately following delivery of the molten glass onto the pool of molten metal and during its initial advance following delivery the glass is supported over a greater depth of molten metal in its central portion and over a lesser depth of molten metal in its marginal portions. As the metal conducts heat from the glass and transfers that heat by convection and conduction to and through the bottom and sides of the forming chamber, the central portion of the advancing glass is preferentially cooled.

Not only is the highly conductive molten metal more shallow beneath the marginal portions of the advancing glass, but also the less conductive bottom (usually refractory) of the forming chamber is thicker beneath the marginal portions of the advancing glass. Both of these features decrease the overall effective thermal conductivity of the composite structure supporting the marginal portions of an advancing layer of glass relative to that of the composite structure supporting the central portion of the advancing layer of glass. Thus, the marginal portions of the glass lose their fluidity less rapidly compared to the rate at which the central portion of the glass loses its fluidity. This permits the reduction of transverse velocity gradients in the glass and promotes the transversely uniform transmission of traction and attenuating forces along the glass.

The bottom of the forming chamber provides for a deeper pool of molten metal in the central portion of the chamber than in the marginal portions of the chamber adjacent the side walls. Thus, conductive heat transfer from the glass to the molten metal is enhanced in the central portion of the chamber relative to similar heat transfer in the marginal portions of the chamber. In a preferred embodiment the surface of the molten metal is maintained at or near the elevation of a layer of molten glass flowing through a delivery facility connected to the forming chamber. Such bottom construction is particularly beneficial in a glass forming apparatus such as described by Edge and Kunkle in U.S. Pat. No. 3,843,346, the disclosure of which is incorporated herein to illustrate an apparatus and process for delivering molten glass along a substantially horizontal path between side wall members of jambs onto a pool of molten metal for forming it into a continuous sheet of glass while supporting it thereon. In that environment a bottom, such as described here, has the particular utility of enhancing the forward flow of glass in the marginal edge portions of an advancing layer of glass relative to the forward flow of glass in the central portion of the advancing layer of glass. This materially assists in further minimization of "herringbone" distortion in the marginal edge portions of a sheet of glass being produced. "Herringbone" distortion is, of course, an optical distortion pattern of repeating angular regions of differing optical thickness along the length (direction of advance) of a continuous sheet of glass.

In a preferred embodiment of this invention, the bottom of a forming chamber immediately downstream of a glass delivery facility is scooped out in its central portion with the depth for a pool of molten metal over the bottom gradually increasing to a maximum depth near the centerline of the chamber. The depth also gradually increases as one moves along the chamber centerline or central portion downstream from the delivery facility. At a convenient distance downstream from the delivery facility, preferably at a location where a delivered layer of glass will reach either an equilibrium thickness or half its delivery thickness, whichever distance is shorter, the bottom of the forming chamber may be flat without adversely affecting the beneficial effects obtained through use of a scooped bottom upstream of that location.

In a particularly preferred embodiment of this invention wherein a layer of glass is delivered along a substantially horizontal path onto a pool of molten metal, the scooped-out, central portion of the forming chamber bottom is preferably in the shape of a truncated paraboloid.

Since the thermal conductivity of molten metal is much greater than that of glass and since the heat transfer from the delivered glass to the adjacent molten metal beneath it is directly proportional to the temperature difference between them and consequently directly proportional to the thermal gradients in the molten metal, the differing molten metal thickness serves to balance heat transfer rates across the width of the delivered layer of glass and to favor heat transfer from the glass in the central portion of the layer. Just as conductance is inversely proportional to the cross-sectional area of a conductor so, too, is the rate of heat transfer made to vary across the width of the pool of molten metal. This tends to stabilize the path of advance of the glass. As relatively more heat is removed from the central portion of the advancing glass, longitudinal tractive forces are more effectively transferred along the central portion of the glass. Since any occasional imbalance in transmitted force acts with less leverage on the layer of glass if it acts near the center of the glass than if it acts near a margin of the glass, any relative concentration of transmitted forces along the central portion of the glass, rather than along its marginal edges, tends to stabilize the path of advance of the glass.

This invention also takes advantage of the fact that the viscosity of a glass at temperatures in the forming range is highly responsive to and dependent upon the temperature of the glass. Since longitudinal tractive forces acting upon a layer of glass to advance it and to form or attenuate it into a continuous sheet of glass are transmitted through the glass itself due to the surface tension of the glass, it has been discovered that the effectiveness of such force transfer is subject to thermal control. Thus, it is now possible to effectively adjust and maintain the extent of force transfer along one marginal edge portion of the glass independently with respect to adjustment and maintenance of force transfer along the other marginal edge portion of the glass. In this manner the advancing glass may be steered. As a greater force is transmitted to more fluid glass in the upstream portion of a forming chamber, the greater that glass tends to accelerate, and at its marginal edge, it then tends to seek a shorter (and, thus, straighter) path of advance. Thus, by transmitting more force through the glass along one marginal edge, it is possible to move that marginal edge into more perfect alignment with the side walls of the forming chamber. For example, if a marginal edge of the glass has drifted or bulged outwardly toward a side wall, the transmission of more longitudinal force to the glass in the region of such bulge or drift will move the glass away from the side wall.

This invention will be further understood with reference to the accompanying drawings and the detailed description of the illustrated embodiments which follows.

DESCRIPTION OF THE PREFERRED EMBODIMENTS

Figure 1:
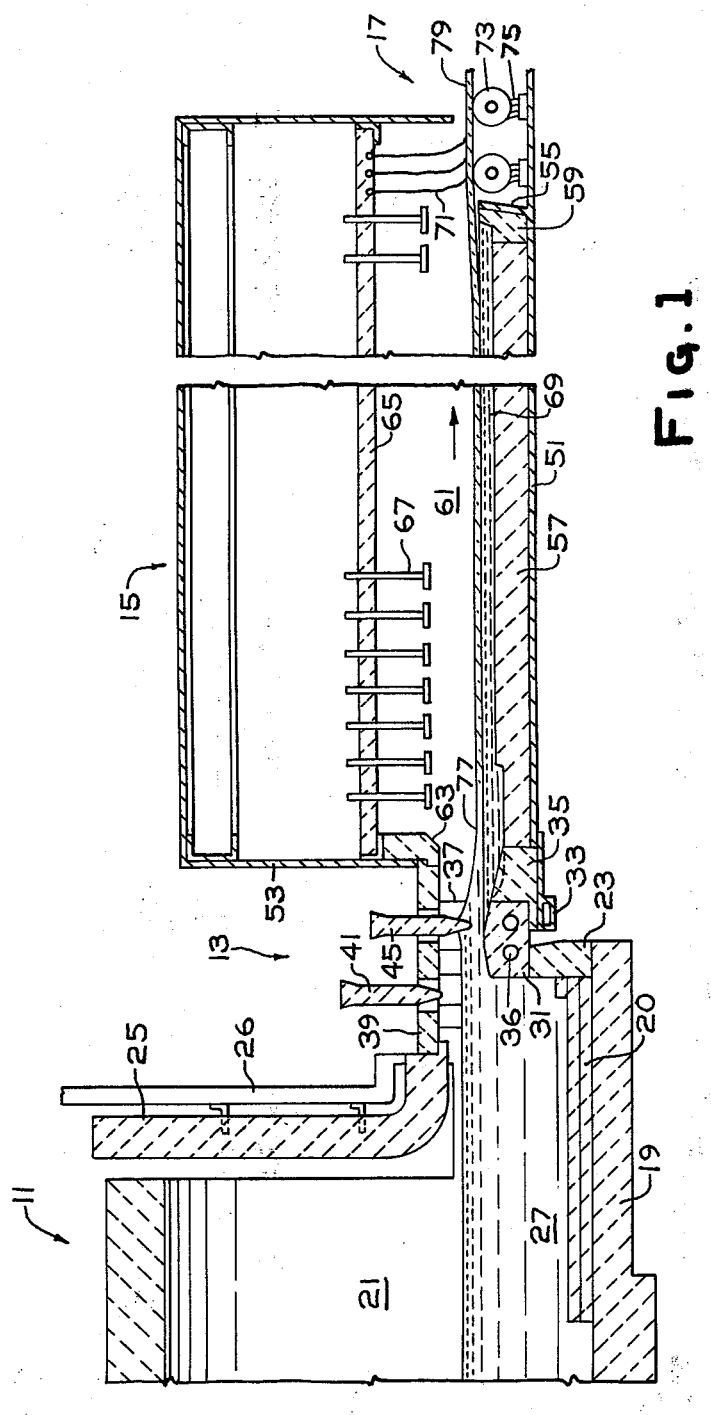
FIG. 1 is a sectional elevation view of an apparatus for producing flat glass in accordance with this invention.

Referring now to FIG. 1 there is shown a view of a suitable apparatus for carrying out the present invention. The glassmaking apparatus comprises a furnace 11, delivery means 13 and a forming chamber 15 and a glass removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 20, side walls 21 and a front basin wall 23. The furnace further comprises an upper front wall 25 which is preferably suspended or supported from above by a structural support 26 and a roof overlying the upper portion of the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, defines an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably a refractory bottom that has been cast in place inside the bottom casing 51 between the inlet end bottom 35 and an exit lip 59 mounted or cast against the lip casing 55. Preferably embedded within the bottom refractory 57 are pipes such as shown in the copending application of Kunkle which is incorporated by reference herein. Coolant or other fluid may be directed through such pipes for controlling the temperature of the forming chamber 15 at discrete locations along its length. Particularly in a short forming chamber, dams or weirs are mounted in the refractory bottom 57, and these extend across its width. These dams are preferably vertically movable and are held down at their ends at each side of the forming chamber. They are preferably constructed of material that is less dense than the molten metal in the forming chamber so that their vertical position may be varied upwardly or downwardly by controlled adjustment of their holddown devices at their ends.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15, preferably includes a top casing end wall that extends over the glass removal or withdrawal facility 17 at the downstream end of the forming chamber 15. Disposed within the bottom container portion of the forming chamber is a pool of molten metal 69, preferably molten tin or an alloy of tin.

At the downstream end of the forming chamber is the glass removal facility 17 for withdrawing a continuous sheet of glass from the surface of the pool of molten metal 69 and for conveying a withdrawn sheet of glass from the forming chamber 15. The glass removal facility includes curtains 71 or other barriers or seals to segregate the headspace of the forming chamber from the outside environment. These are preferably flexible curtains of heat resistant cloth (e.g., asbestos) or the like. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber).

Figure 2:
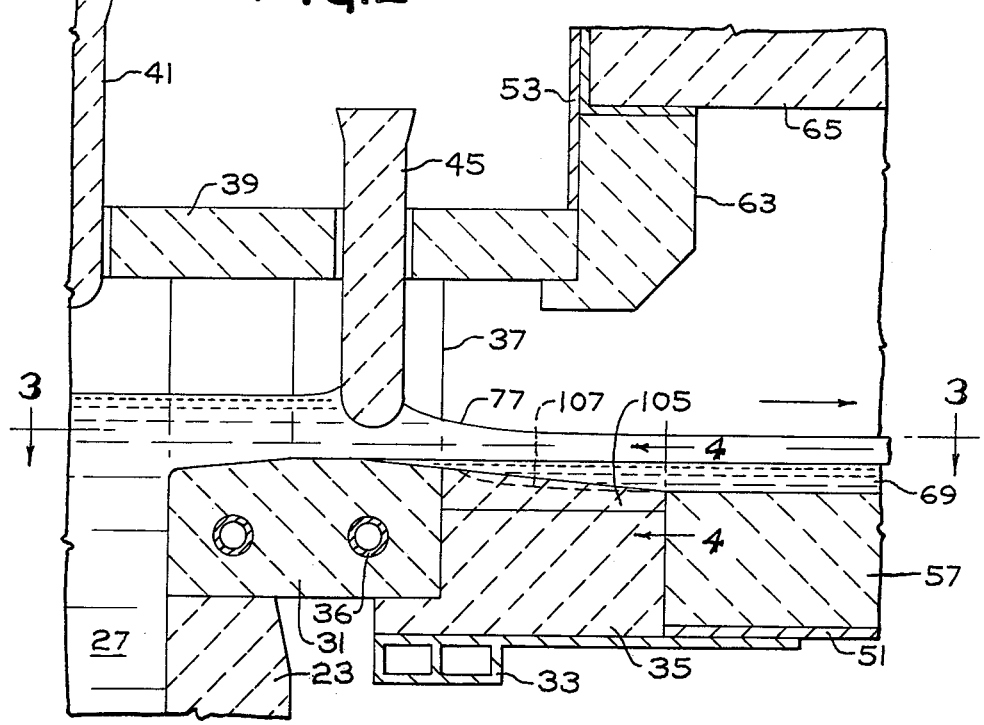
FIG. 2 is a partial sectional elevation view of the delivery facility and upstream end of the forming chamber shown in FIG. 1 illustrating in detail the preferred forming chamber bottom.
Figure 3:
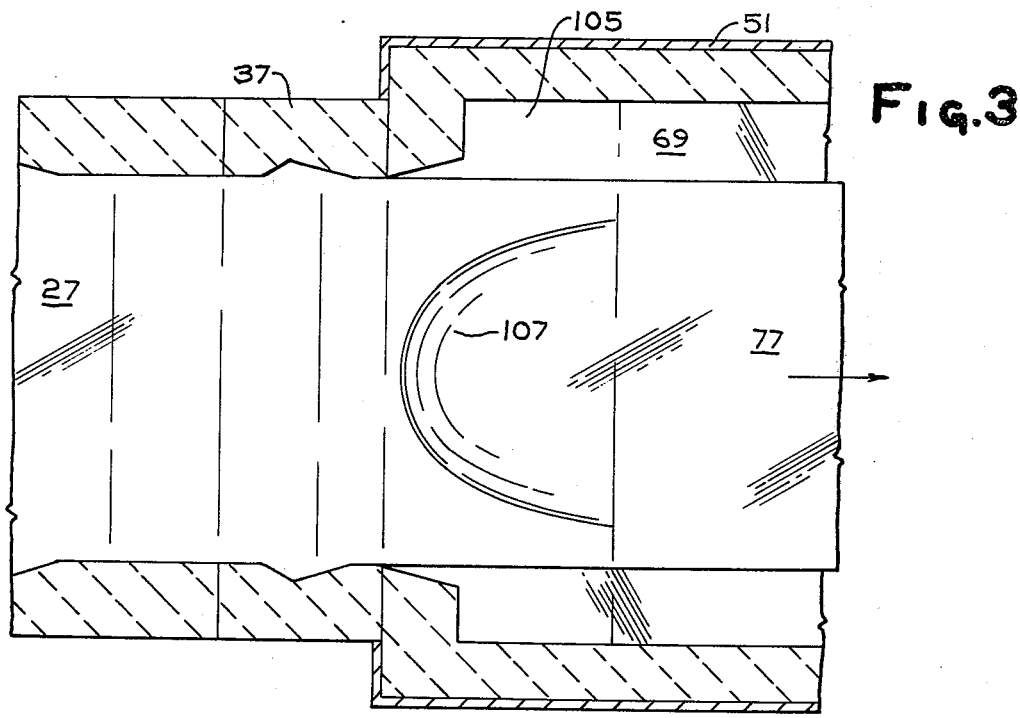
FIG. 3 is a partial sectional plan view of the delivery facility and upstream end of the forming chamber seen in FIG. 2 and taken along section line 3—3 of FIG. 2.
Figure 4:
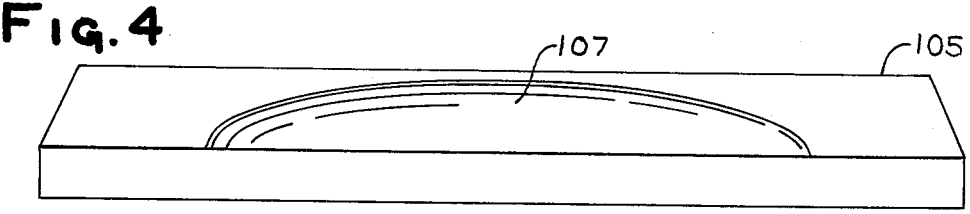
FIG. 4 is a partial sectional elevation of the bottom of the forming chamber taken along section line 4—4 of FIG. 2.

Referring now to FIGS. 2, 3 and 4, the details of the bottom structure of a preferred forming chamber may be appreciated. The bottom seal portion 35 of the upstream end of a forming chamber is provided with a top portion 105 comprising a forming chamber entrance floor. This may be a separate refractory piece or may merely be the upper portion of the refractory bottom at that location.

The forming chamber entrance floor 105 generally slopes downwardly from its upstream end which is adjacent a threshold 31 in the preferred embodiment of this invention. This downward slope is apparent along the sides of the entrance floor 105 closest the side walls 61 of the forming chamber. In the central portion of the entrance floor 105 is a depression or scooped-out portion 107 providing for a greater depth of molten metal under the central portion of a delivered layer of glass 77 than under the marginal edge portions of a delivered layer of glass. In an apparatus wherein a layer of glass is delivered substantially horizontally onto the molten metal, the depression 107 in the entrance floor 105 preferably has the shape of a section of a paraboloid as shown in the drawings. Such a shape enhances development of a heat transfer pattern between delivered glass and the molten metal beneath it which preferentially cools the central portion of the glass and increases its viscosity relative to the viscosity of the glass in the marginal edge portions of the glass. This, in turn, provides a counteracting resistance to the otherwise favored velocity gradient in an advancing layer of molten glass.

When carrying out the method of glass manufacture using the described apparatus, a layer of molten glass (for example, soda-lime-silica glass) is delivered onto the surface of molten tin in the forming chamber at a rate of about 40 tons per day (36 × 10³ kilograms per day). The average temperature of the delivered glass is about 2050°F. (1120°C.). The glass is delivered as a layer having a depth of ½ inch (1.27 cm) and a width of 6 feet (1.83 meter). The chamber has an entrance floor extending 6 feet (1.83 meter) from a threshold. A molten metal depth of ½ inch (1.27 cm) is provided at the upstream end of the entrance floor and a depth of 2.5 inches (7.6 cm) is provided at the downstream end of the entrance floor. This depth is maintained for 6 feet (1.87 meter) farther downstream in the chamber; thereafter the bottom provides for a metal depth of 2 inches (5.1 cm). The depression in the entrance section begins about 6 inches (15.3 cm) from the threshold; its width at the downstream end of the entrance floor is about 5 feet (1.52 meter); and it is approximately parabolic.

The advancing glass is observed for an extended time and it remains in a path aligned along the center of the forming chamber. This is in contrast to the drift commonly experienced in operating forming chambers of the kind where glass is poured onto molten metal and allowed to spread before forming.

A rod is inserted into the forming chamber through the right side wall about 6 feet (1.87 meter) from the threshold, and the glass is pushed about 6 inches (15.3 cm) toward the left side wall. The glass is observed and in about 15 minutes the glass has almost returned to its original alignment; within 30 minutes its path appears to be in perfect alignment with the forming chamber.

The sheet of glass that is produced has excellent optical quality across its width.

Although this invention has been described with reference to particular embodiments of it which are illustrated here, those skilled in the art of glassmaking will appreciate that the specific embodiments described may be modified without departing from the spirit or scope of this invention.

I claim:

1. In a process for making flat glass wherein molten glass is delivered onto the surface of a pool of molten metal in an enclosed forming chamber having a bottom, an upstream inlet end, a downstream outlet end, and a roof and side walls extending from the upstream end to the downstream end of the chamber and providing an enclosed space between them and beneath the roof; advancing the glass along the surface of the pool of molten metal from the upstream end toward the downstream end of the chamber; cooling the advancing glass to form a dimensionally stable, continuous sheet of glass therefrom; and removing the continuous sheet of glass from the forming chamber, wherein the advancing glass has a tendency to drift from a direct path of advance; the improvement for treating the glass substantially immediately following its delivery onto the molten metal comprising maintaining the depth of the molten metal beneath the glass sufficiently deeper in the central portion of the chamber than in the marginal portions of the chamber spaced inwardly from the side walls such that the glass in the central portion is cooled to a greater degree than the glass in the marginal portions, whereby the glass maintains its advance along a path substantially aligned with the centerline of the chamber midway between the side walls of the chamber.

2. The method according to claim 1 wherein the glass is delivered onto the pool of molten metal along a substantially horizontal path and the molten metal beneath the glass is maintained at a greater depth along the central portion of the chamber than along the marginal portions of the chamber spaced inwardly from the side walls in a region extending from the vicinity of the upstream end of the forming chamber to a location downstream therefrom where the advancing glass has a thickness of less than about one-half its delivered thickness.

3. The method according to claim 2 wherein the depth of the molten metal beneath the central portion of the advancing glass substantially immediately following its delivery in such that the molten metal in that central portion is maintained as a truncated paraboloid having its truncated section as a plane substantially parallel to the glass supporting surface of the molten metal and its apex facing the upstream end of the forming chamber.

4. In an apparatus for making flat glass comprising a forming chamber, means for delivering a layer of molten glass to the forming chamber; and means for removing a formed continuous sheet of flat glass from the forming chamber; wherein the forming chamber includes a bottom, an upstream end adjacent the molten glass delivery means, a downstream end adjacent the glass sheet removal means, side walls extending from the upstream end to the downstream end and upwardly from the bottom and a roof extending between the side walls and between the upstream and downstream ends providing an enclosed space, the enclosed space containing a pool of molten metal on the bottom for receiving and supporting glass delivered thereto and a headspace overlying the pool of molten metal; means for advancing glass along the surface of the pool of molten metal; and means for cooling the glass during its advance for forming it into a continuous sheet; the improvement wherein the bottom of the chamber in a region spaced inwardly from the side walls of the chamber and adjacent the upstream end of the chamber is shaped to provide a sufficiently greater depth of molten metal in a central portion of the chamber than along marginal portions of the chamber spaced inwardly from the side walls of the chamber such that the glass in said central portion is cooled to a greater degree than the glass in said marginal portions.

5. The apparatus according to claim 4 wherein the bottom of the chamber in the region adjacent the upstream end of the chamber includes a concave depression extending a sufficient distance downstream from the upstream end of the chamber to underlie an advancing layer of glass until its thickness may be caused to be reduced to half the thickness of a delivered layer of molten glass.

6. The apparatus according to claim 4 wherein the surface of molten metal is maintained substantially at the elevator for delivering molten glass along a substantially horizontal path thereto and the bottom of the chamber in the region adjacent the upstream end of the forming chamber includes a concave depression having a continuously curved surface of increasing size moving from the upstream end of the chamber.

7. The apparatus according to claim 6 wherein the concave depression has the shape of a truncated paraboloid having its apex facing the upstream end of the chamber.

* * * * *

UNITED STATES PATENT OFFICE
CERTIFICATE OF CORRECTION

PATENT NO. : 3,936,289
DATED : February 3, 1976
INVENTOR(S) : E. Kears Pollock

It is certified that error appears in the above-identified patent and that said Letters Patent are hereby corrected as shown below:

Column 9, line 10, "in" (first occurrence) should be --is--.

Column 10, line 22, "elevator" should be --elevation--.

Signed and Sealed this fifteenth Day of June 1976

[SEAL]

Attest:

RUTH C. MASON
*Attesting Officer*

C. MARSHALL DANN
*Commissioner of Patents and Trademarks*